(12) United States Patent
Nobayashi et al.

(10) Patent No.: US 7,274,849 B2
(45) Date of Patent: Sep. 25, 2007

(54) THREE-DIMENSIONAL PHOTONIC CRYSTAL AND FUNCTIONAL DEVICE INCLUDING THE SAME

(75) Inventors: Kazuya Nobayashi, Kawasaki (JP);
Akinari Takagi, Yokosuka (JP);
Hikaru Hoshi, Yokohama (JP);
Kiyokatsu Ikemoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/551,741

(22) Filed: Oct. 23, 2006

(65) Prior Publication Data
US 2007/0104442 A1    May 10, 2007

(30) Foreign Application Priority Data
Oct. 26, 2005   (JP)   .............................. 2005-311259
Sep. 20, 2006   (JP)   .............................. 2006-254437

(51) Int. Cl.
*G02B 6/10*   (2006.01)
(52) U.S. Cl. ........................ 385/131; 385/129; 359/332
(58) Field of Classification Search ..................... None
See application file for complete search history.

(56) References Cited

U.S. PATENT DOCUMENTS

| 5,335,240 A | 8/1994 | Ho et al. |
| 5,440,421 A | 8/1995 | Fan et al. |
| 6,358,854 B1 | 3/2002 | Fleming |
| 6,597,851 B2 * | 7/2003 | Johnson et al. ............. 385/131 |

| 2003/0133683 A1 | 7/2003 | Forbes |
| 2003/0223721 A1 * | 12/2003 | Povinelli et al. ............ 385/129 |

FOREIGN PATENT DOCUMENTS

| EP | 1574884 | 9/2005 |
| JP | 2001-074954 | 3/2001 |
| WO | 2003087904 | 10/2003 |
| WO | 2005006039 | 1/2005 |

OTHER PUBLICATIONS

Eli Yablonovitch, "Inhibited Spontaneous Emission in Solid-State Physics and Electronics", Physical Review Letters, vol. 58, pp. 2059-2062, 1987.
12034241, XP, Jun. 02, 2003, Roundy David.
12026739, XP, Nov. 27, 2000, Johnson Steven G.
008075487, XP, Oct. 01, 2003, Maldovan M; et al.
008075485, XP, Sep. 03, 2004, Maldovan M.

* cited by examiner

*Primary Examiner*—Sung Pak
*Assistant Examiner*—Chad H. Smith
(74) *Attorney, Agent, or Firm*—Canon U.S.A. Inc I. P. Div

(57) ABSTRACT

A three-dimensional photonic crystal of the present invention has a complete photonic band gap in a wide wavelength region and that can be easily produced. A three-dimensional photonic crystal in which a plurality of layers including a periodic-refractive-index structure are periodically stacked includes, a first layer having holes provided at lattice points of a first rectangular lattice and a second rectangular lattice, a second layer having columnar structures at lattice points of a face-centered rectangular lattice, a third layer having a periodic structure the same as that of the first layer and disposed at a shifted position, and a fourth layer having a periodic structure the same as that of the second layer.

15 Claims, 17 Drawing Sheets

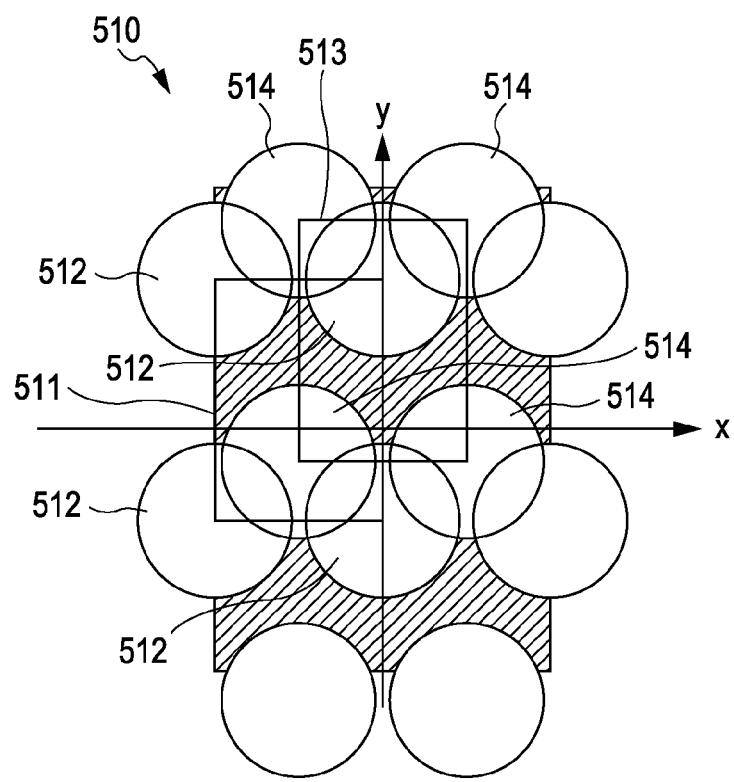
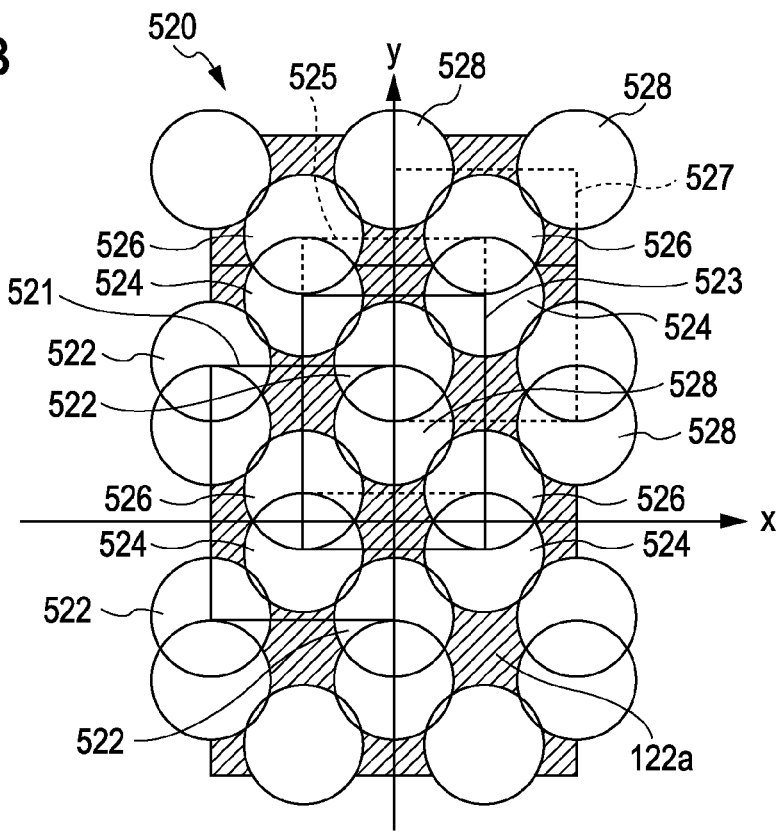

THREE-DIMENSIONAL PHOTONIC CRYSTAL AND FUNCTIONAL DEVICE INCLUDING THE SAME

BACKGROUND OF THE INVENTION

1. Field of the Invention

The present invention relates to a three-dimensional photonic crystal including a three-dimensional refractive index periodic structure and to a functional device including the three-dimensional photonic crystal, such as for example an optical waveguide, an optical resonator, an optical filter, and a polarizer.

2. Description of the Related Art

Yablonovitch has proposed the concept that the transmission and reflection characteristics of an electromagnetic wave can be controlled using a structure smaller than the wavelength of the electromagnetic wave (Physical Review Letters, Vol. 58, pp. 2059, 1987). According to this document, the transmission and reflection characteristics of the electromagnetic wave can be controlled with a periodic structure smaller than the wavelength.

In particular, when the wavelength of electromagnetic waves is reduced to about the wavelength of visible light, transmission and reflection characteristics of the visible light can be controlled. Such a structure is known as a photonic crystal. It has been suggested that a reflecting mirror having a reflectance of 100% in a certain wavelength region can be manufactured.

Thus, a certain wavelength range in which a reflectance of near 100% can be realized may be referred to as a photonic band gap, as compared to the energy gap in a semiconductor.

Furthermore, a three-dimensional fine periodic structure can provide a photonic band gap for incident light from any direction. This is hereinafter referred to as a complete photonic band gap.

The complete photonic band gap can have various applications (for example, reduced spontaneous emission in a light-emitting device). A structure that can achieve a complete photonic band gap in a wider wavelength region can facilitate extending the operating wavelength region of such a functional device.

Some structures having a complete photonic band gap have been proposed (see for example U.S. Pat. Nos. 5,335,240, 5,440,421, and 6,597,851).

FIG. 14A shows a woodpile structure proposed in U.S. Pat. No. 5,335,240. In this structure, a plurality of columnar structures disposed in parallel are stacked, the alignment of each layer rotated by 90 degrees with respect to that of adjacent layers.

FIG. 14B is a schematic view of a structure exhibiting a photonic bandgap disclosed in U.S. Pat. No. 5,440,421. In this structure, a plurality of holes have been made in a direction perpendicular to a plurality of columnar structures that are disposed in parallel so that parts of the columnar structures overlap in the stacking direction.

FIG. 14C is a schematic view of a structure exhibiting a photonic bandgap disclosed in U.S. Pat. No. 6,597,851. In this structure, layers having holes provided in the form of a triangular lattice and columnar structures provided in the form of a triangular lattice are stacked with a shift of ⅓ of the fundamental period between adjacent layers.

In the woodpile structure disclosed in U.S. Pat. No. 5,335,240, since four layers constitute one period, the structure is simple and is easily produced. However, the structure has a strong anisotropy, resulting in a strong directional dependence of the photonic bandgap.

The structure disclosed in U.S. Pat. No. 5,440,421 also has a complete photonic bandgap. However, a plurality of very deep holes must be formed, and it is very difficult to produce the structure.

The structure disclosed in U.S. Pat. No. 6,597,851 has an anisotropy smaller than that of the woodpile structure and has a relatively large photonic bandgap. However, since six layers constitute one period, the fabrication process is complex, for example, high accuracy is necessary for the alignment of layers. Thus, it is difficult to produce the structure.

SUMMARY OF THE INVENTION

Accordingly, the present invention provides a three-dimensional photonic crystal that has a complete photonic band gap in a wide wavelength region and that can be easily produced. The present invention also provides a functional device including the same.

According to a three-dimensional photonic crystal of the present invention, a three-dimensional photonic crystal in which a plurality of layers including a periodic-refractive-index structure are periodically stacked includes a first layer having a periodic structure in which holes filled with a second medium are provided at lattice points of a first rectangular lattice having a period of A along a first axis in the in-plane direction of the layers and a period of B along a second axis orthogonal to the first axis in the in-plane direction of the layers and at lattice points of a second rectangular lattice disposed at a position shifted by A/2 along the first axis and by B/4 along the second axis with respect to the position of the first rectangular lattice, and areas other than the holes are filled with a first medium; a second layer having a periodic structure in which columnar structures that are composed of the first medium and that have a longitudinal axis in the stacking direction are provided at lattice points of a face-centered rectangular lattice that is disposed at a position shifted by +3B/8 along the second axis with respect to the position of the first rectangular lattice and that has a period of A along the first axis and a period of B along the second axis, and the area other than the columnar structures is filled with the second medium; a third layer having a periodic structure the same as the periodic structure included in the first layer and disposed at a position shifted in the in-plane directions of the layer by A/2 along the first axis and by B/2 along the second axis with respect to the position of the periodic structure included in the first layer; and a fourth layer having a periodic structure the same as the periodic structure included in the second layer and disposed at the same position as the periodic structure included in the second layer in the in-plane directions of the layer. In the three-dimensional photonic crystal, the first layer, the second layer, the third layer, and the fourth layer are periodically stacked in that order.

Further features of the present invention will become apparent from the following description of exemplary embodiments (with reference to the attached drawings).

BRIEF DESCRIPTION OF THE DRAWINGS

FIGS. 4A to 4D are schematic views of each layer of a three-dimensional photonic crystal according to a second embodiment of the present invention.

DESCRIPTION OF THE EMBODIMENTS

Figure 1:
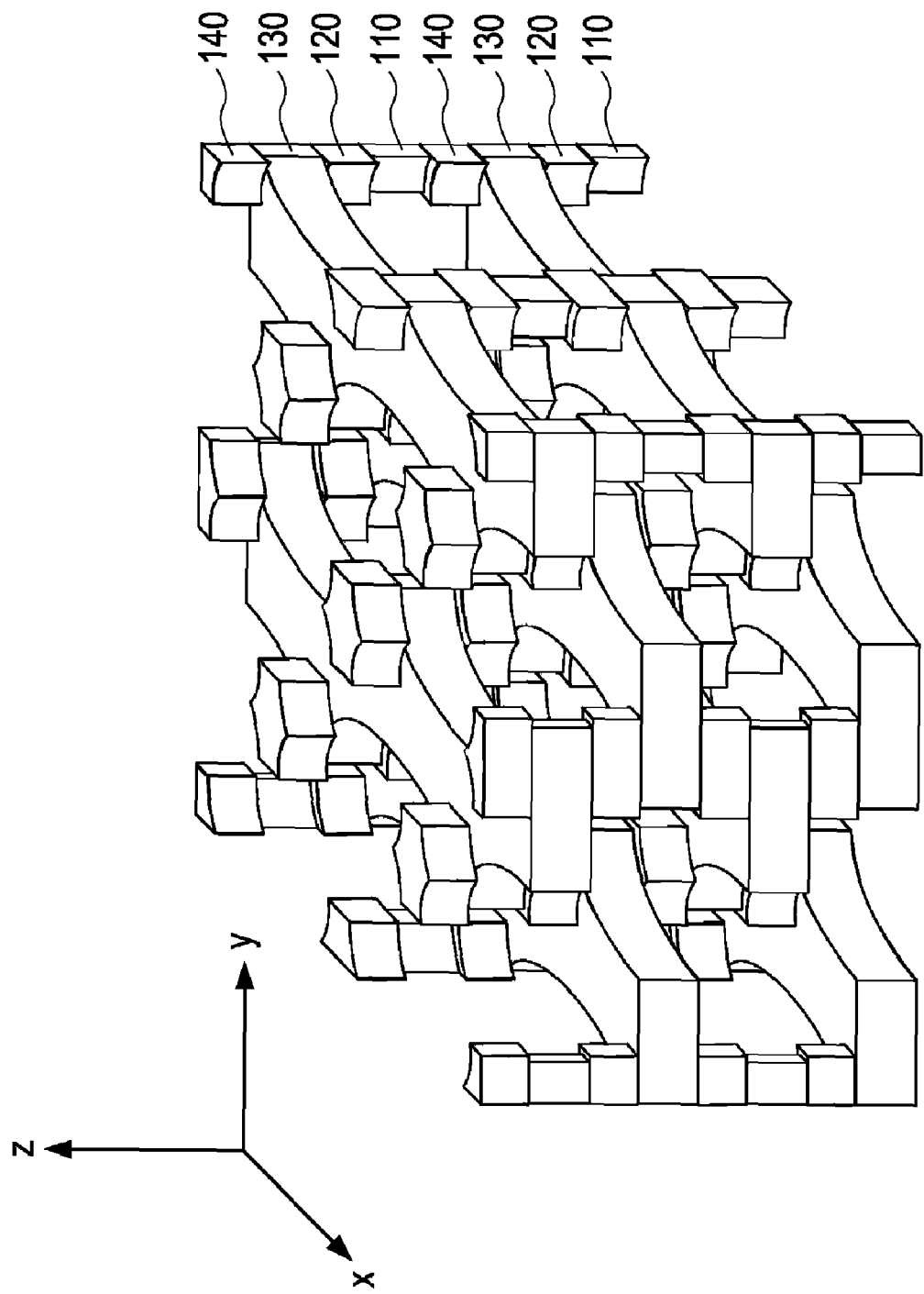
FIG. 1 is a schematic view of a three-dimensional photonic crystal according to an embodiment of the present invention.

FIG. 1 is a schematic view of the relevant part of a three-dimensional photonic crystal according to an embodiment of the present invention. In FIG. 1, the direction in which layers 110 to 140 constituting a three-dimensional photonic crystal are stacked is defined as the z-axis, a direction that is perpendicular to the z-axis and that is an in-plane direction of the layers is defined as the x-axis, and a direction that is orthogonal to the x-axis in the planes of the layers is defined as the y-axis. In the three-dimensional photonic crystal, the four layers 110 to 140, each having a periodic-refractive-index structure therein, together form a fundamental period in the stacking direction. A plurality of the fundamental periods are stacked, thereby forming the three-dimensional photonic crystal.

First Embodiment

FIGS. 2A to 2D are schematic views of each layer of the three-dimensional photonic crystal of the first embodiment of the present invention. Each shows a part of the x-y cross-section of one of the layers 110 to 140.

Figure 2A:
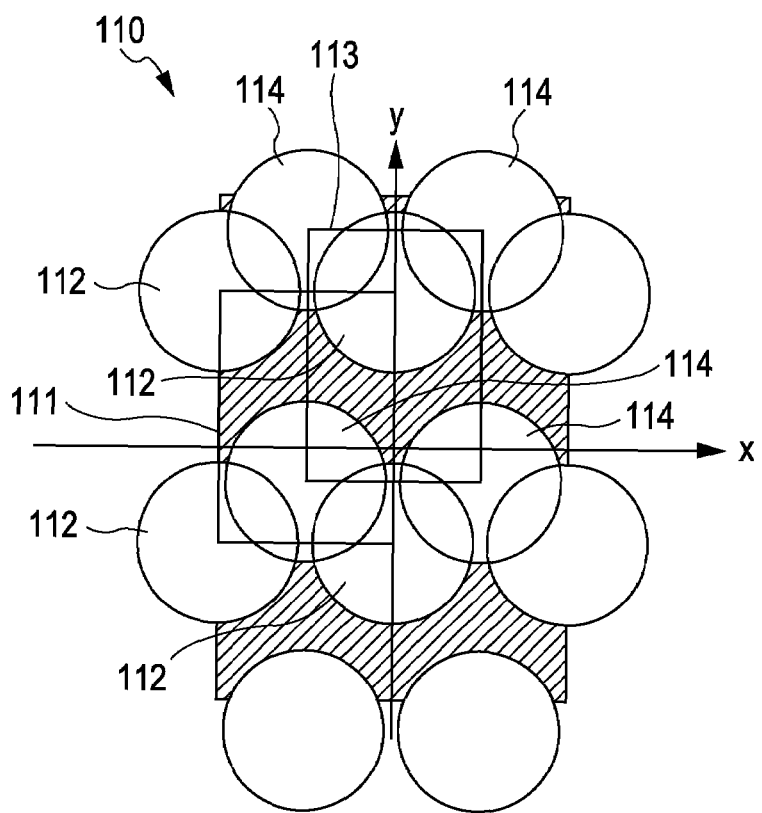
FIGS. 2A to 2D are schematic views of each layer of the three-dimensional photonic crystal according to the first embodiment of the present invention.

FIG. 2A is an x-y cross-sectional view of the first layer 110. In FIG. 2A, a rectangular lattice 111 has a period of A in the x-axis direction and a period of B in the y-axis direction. A rectangular lattice 113 has the same shape as that of the rectangular lattice 111 and is disposed at a position shifted by A/2 in the x-axis direction and by B/4 in the y-axis direction with respect to the position of the rectangular lattice 111. The first layer 110 has a periodic-refractive-index structure defined by the two rectangular lattices 111 and 113. More specifically, circular holes 112 and circular holes 114 having a radius of R1 and filled with a second medium (having a low refractive index N2) are disposed on each lattice point of the rectangular lattice 111 and the rectangular lattice 113. Areas other than the circular holes 112 and 114 are filled with a first medium (having a high refractive index N1).

Figure 2B:
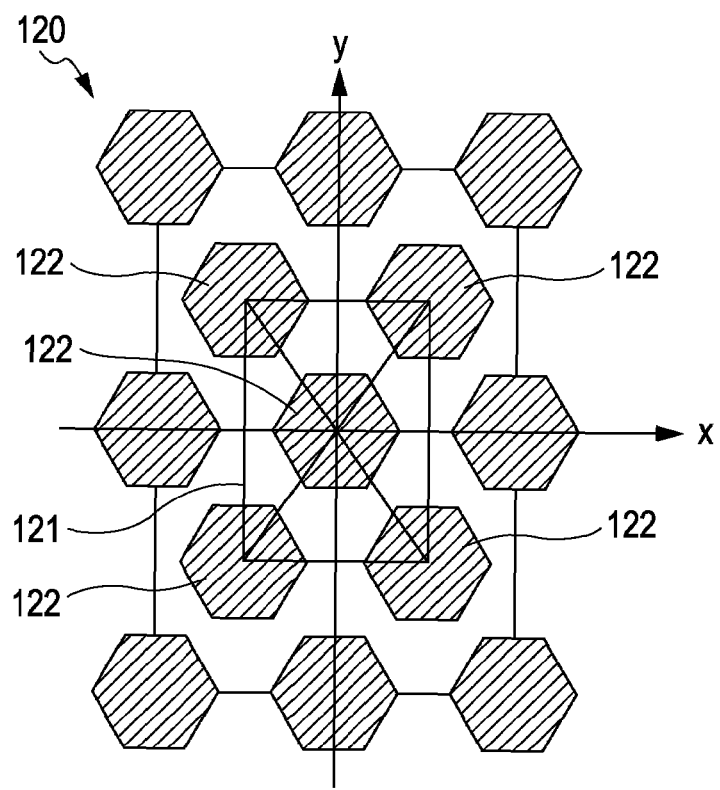

FIG. 2B is an x-y cross-sectional view of the second layer 120. The second layer 120 shown in FIG. 2B has a periodic-refractive-index structure defined by a face-centered rectangular lattice 121 having a period of A in the x-axis direction and a period of B in the y-axis direction. The face-centered rectangular lattice 121 has the same shape as that of the rectangular lattice 111 in the first layer 110 and is disposed at a position shifted by +3B/8 in the y-axis direction with respect to the position of the rectangular lattice 111. Columnar structures having a longitudinal axis in the z-axis direction (for example, hexagonal columns 122) are disposed at the lattice points of the face-centered rectangular lattice 121. An area other than the columnar structures 122 is filled with the second medium. The columnar structures are defined by a circumcircle having a radius R2 and are formed of a third medium (having a high refractive index N3). Each of the columnar structures 122 in the second layer 120 is disposed at a position in which the distance from the adjacent circular hole in the first layer 110 is equal to the distance from the adjacent circular hole in the third layer 130.

Figure 2C:
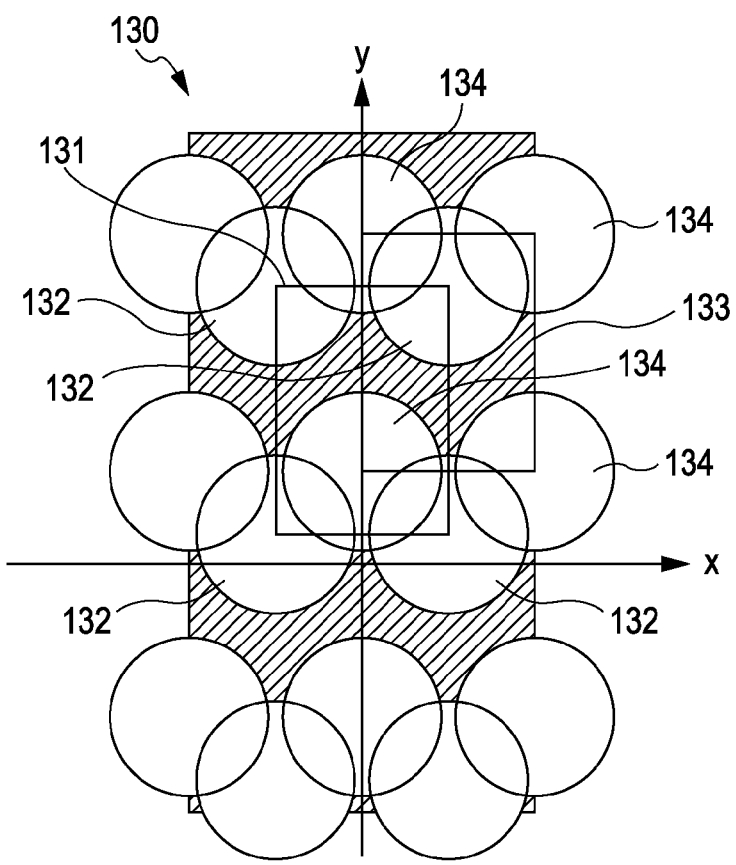

FIG. 2C is an x-y cross-sectional view of the third layer 130. In FIG. 2C, a rectangular lattice 131 and a rectangular lattice 133 are disposed at positions shifted by A/2 in the x-axis direction and by B/2 in the y-axis direction with respect to the positions of the rectangular lattice 111 and the rectangular lattice 113 in the first layer 110, respectively. Circular holes 132 and circular holes 134 having a radius of R1 and filled with the second medium are disposed on each lattice point of the rectangular lattice 131 and the rectangular lattices 133. Areas other than the circular holes 132 and the circular holes 134 are filled with the first medium.

Figure 2D:
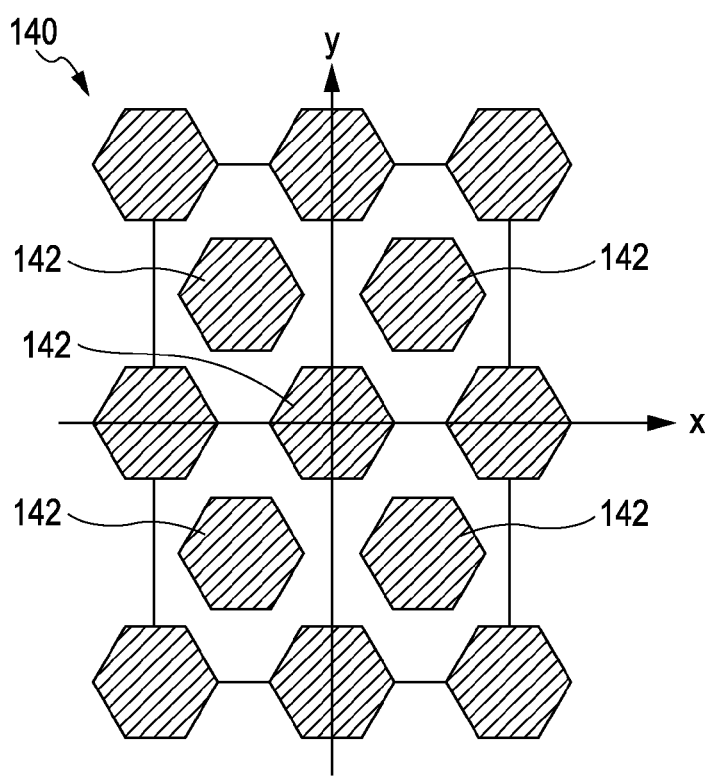

FIG. 2D is an x-y cross-sectional view of the fourth layer 140. The fourth layer 140 shown in FIG. 2D has a periodic-refractive-index structure defined by a face-centered rectangular lattice 141 that is disposed at the same position in the x and y directions as the face-centered rectangular lattice 121 in the second layer 120. A columnar structure 142 composed of the first medium is disposed on each lattice point of the face-centered rectangular lattice 141. An area other than the columnar structures 142 is filled with the second medium.

In the first embodiment, the following parameters are optimized to provide a complete photonic band gap in a desired frequency (wavelength) region: the refractive indices N1, N2, and N3 of the first medium, the second medium, and the third medium, the radius R1 of the circular holes in the first layer 110 and the third layer 130, the radius R2 of the circumcircle of the hexagonal columns in the second layer 120 and the fourth layer 140, the thicknesses of the layers 110 to 140, and the lattice periods A and B.

Figure 3:
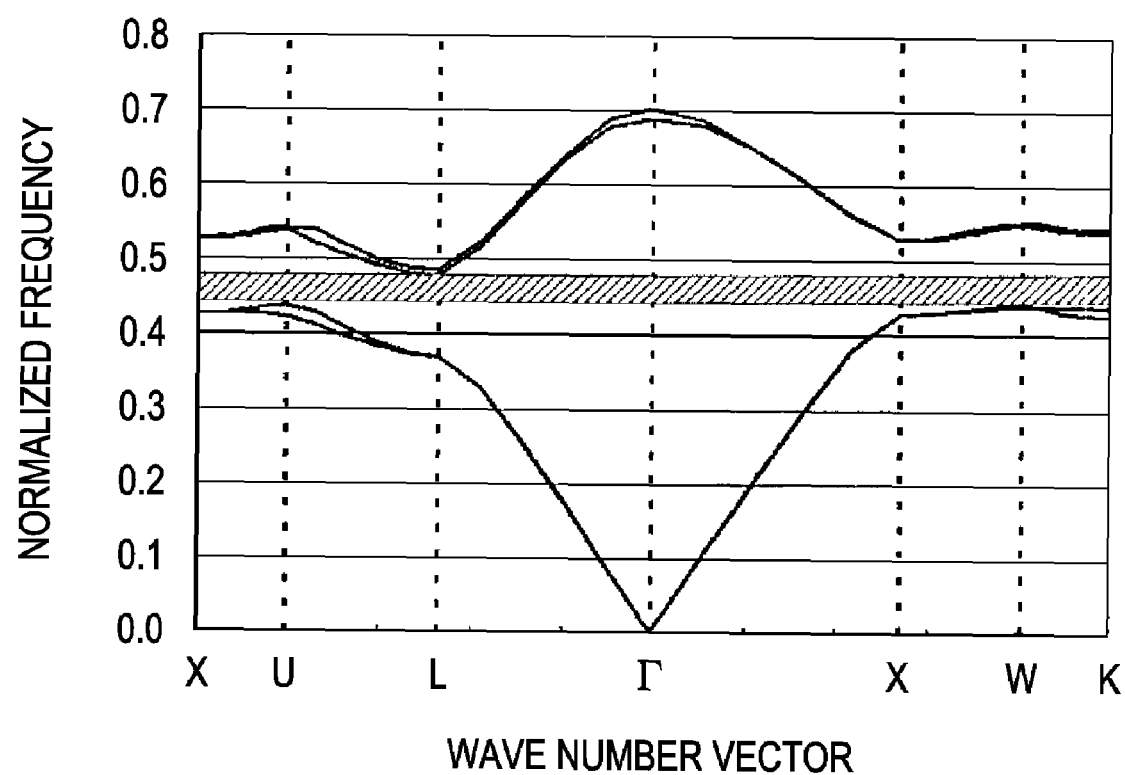
FIG. 3 is a schematic diagram of a photonic band structure of the three-dimensional photonic crystal according to the first embodiment of the present invention.

Table 1 illustrates an example of these parameters. FIG. 3 shows a photonic band structure of the three-dimensional photonic crystal shown in Table 1 calculated by the plane-wave expansion method.

The abscissa represents a wavenumber vector, that is, the incident direction of electromagnetic waves incident on the photonic crystal. For example, point K represents a wavenumber vector parallel to the z-axis, and point X represents a wavenumber vector having a slope of 45° with respect to the z-axis (or the x-axis) in the x-z plane. The ordinate represents a frequency normalized by a lattice period A (normalized frequency). In the area ranging from a normalized frequency of 0.44 to a normalized frequency of 0.48, which is shown by the hatching in FIG. 3, light cannot be present regardless of the incident direction of the light, thus forming a complete photonic bandgap. When the center (normalized) frequency of the complete photonic bandgap is represented by $\omega_0$, and the (normalized) frequency bandwidth of the complete photonic bandgap is represented by $\Delta\omega$, the complete photonic bandgap ratio $\Delta\omega/\omega_0$ in this structure is 0.082. This value is about 1.2 times the complete photonic bandgap ratio of the woodpile structure composed of media having the same refractive indices (the refractive index of the medium constituting the rectangular columns being 2.4 and the refractive index of the medium constituting areas other than the rectangular columns being 1.0).

As a specific example of a structure having the parameters illustrated in Table 1, when the lattice period A is 250 nm, the radius R1 is 107.5 nm, the radius R2 is 65 nm, the lattice period B is 353.6 nm, the thickness H1 is 77.5 nm, and the thickness H2 is 47.5 nm. This structure has a complete photonic band gap center wavelength of 543.3 nm and a complete photonic band gap wavelength region of 522.0 nm to 566.5 nm.

In the three-dimensional photonic crystal according to the first embodiment, as illustrated in FIGS. 2A and 2C, the regions formed of the high refractive index (N1) medium extending along the x-axis curve more smoothly than the woodpile structure. This curvature increases the isotropy in individual layers and between the layers of the structure. This facilitates the occurrence of a standing wave having a concentrated energy in the high refractive index (N1) medium in an electromagnetic wave propagated along the x-axis. Furthermore, a projection in the curvature also increases the isotropy of the structure in the oblique direction on a yz cross-section, as illustrated in FIGS. 2A and 2C. This facilitates the occurrence of a standing wave having a concentrated energy in the medium having the low refractive index. This increases a difference in energy between the standing wave mainly concentrated in the high refractive index medium and the standing wave mainly concentrated in the low refractive index medium. The increased energy difference can widen the frequency band at which a complete photonic band gap is achieved.

To achieve the effects described above, while the hexagonal columns 122 in the second layer 120 illustrated in FIG. 2B and the hexagonal columns 142 in the fourth layer 140 illustrated in FIG. 2D are used in the first embodiment, a column other than a hexagonal column, such as a polygonal column, a cylinder, or a cylindroid, can also be used as alternatives.

TABLE 1

| | |
|---|---|
| Refractive index of first medium (N1) | 2.4 |
| Refractive index of second medium (N2) | 1.0 |
| Refractive index of third medium (N3) | 2.4 |
| Radius R1 | 0.430 × A |
| Radius R2 | 0.260 × A |
| Lattice period B | $\sqrt{2}$ × A |
| Thicknesses H1 of first layer | 0.310 × A |

TABLE 1-continued

| | |
|---|---|
| 110 and third layer 130 Thicknesses H2 of second layer 120 and fourth layer 140 | 0.190 × A |

As described above, in this embodiment, layers having a periodic-refractive-index structure are stacked to form a photonic crystal. The three-dimensional photonic crystal according to the first embodiment may include part of this stacked construction.

The holes formed in the first layer 110 and the third layer 130 have the in-plane cross-section of at least one selected from a circle, an ellipse, and a polygon.

Second Embodiment

FIGS. 4A to 4D are schematic views of each layer of the three-dimensional photonic crystal of a second embodiment of the present invention.

FIG. 4A is an x-y cross-sectional view of the first layer 510. In FIG. 4A, a rectangular lattice 511 has a period of A in the x-axis direction and a period of B in the y-axis direction. A rectangular lattice 513 has the same shape as that of the rectangular lattice 511 and is disposed at a position shifted by A/2 in the x-axis direction and by B/4 in the y-axis direction with respect to the position of the rectangular lattice 511. The first layer 510 has a periodic-refractive-index structure defined by the two rectangular lattices 511 and 513. More specifically, circular holes 512 and circular holes 514 having a radius of R1 and filled with a second medium (having a low refractive index N2) are disposed on each lattice point of the rectangular lattice 511 and the rectangular lattice 513. Areas other than the circular holes 512 and 514 are filled with a first medium (having a high refractive index N1).

Figure 4C:
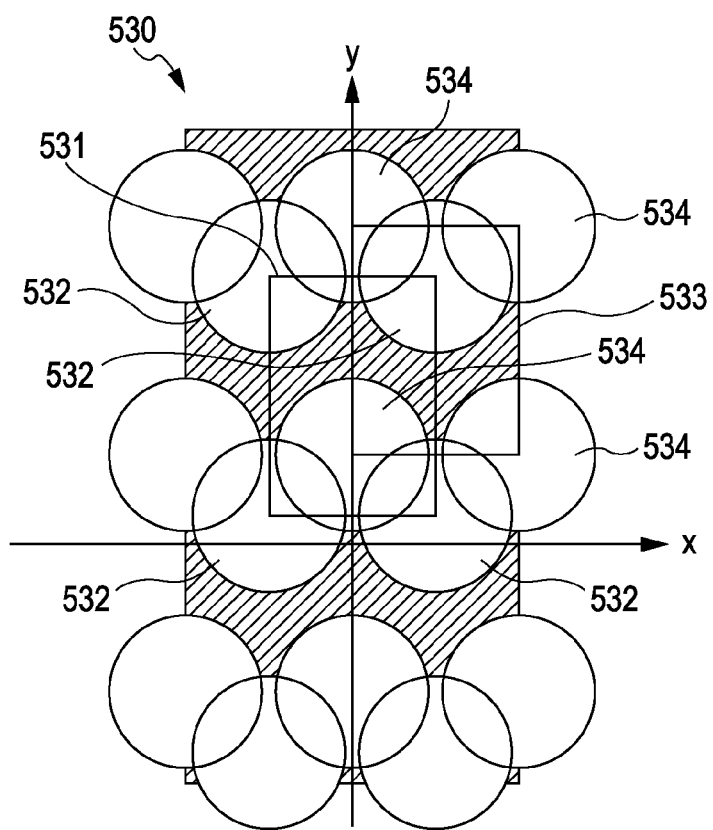

FIG. 4C is an x-y cross-sectional view of the third layer 530. In FIG. 4C, a rectangular lattice 531 and a rectangular lattice 533 are disposed at positions shifted by A/2 in the x-axis direction and by B/2 in the y-axis direction with respect to the positions of the rectangular lattice 511 and the rectangular lattice 513 in the first layer 510, respectively. Circular holes 532 and circular holes 534 having a radius of R1 and filled with the second medium are disposed on each lattice point of the rectangular lattice 531 and the rectangular lattices 533. Areas other than the circular holes 532 and the circular holes 534 are filled with the first medium.

FIG. 4B is an x-y cross-sectional view of the second layer 520. In FIG. 4B, rectangular lattices 521 and 523 are disposed at the same transverse positions as the rectangular lattices 511 and 513 in the first layer 510. Circular holes 522 and 524 having a radius R2 are disposed at the lattice points of the rectangular lattices 521 and 523 and are filled with the second medium.

Rectangular lattices 525 and 527 in the second layer 520 are disposed at the same transverse positions as the rectangular lattices 531 and 533 in the third layer 530. Circular holes 526 and 528 having a radius R2 are disposed at the lattice points of the rectangular lattices 525 and 527 and are filled with the second medium. Areas other than the Circular holes 522, 524, 526, and 528 in the second layer 520 are filled with a third medium (having a high refractive index N3).

Figure 4D:
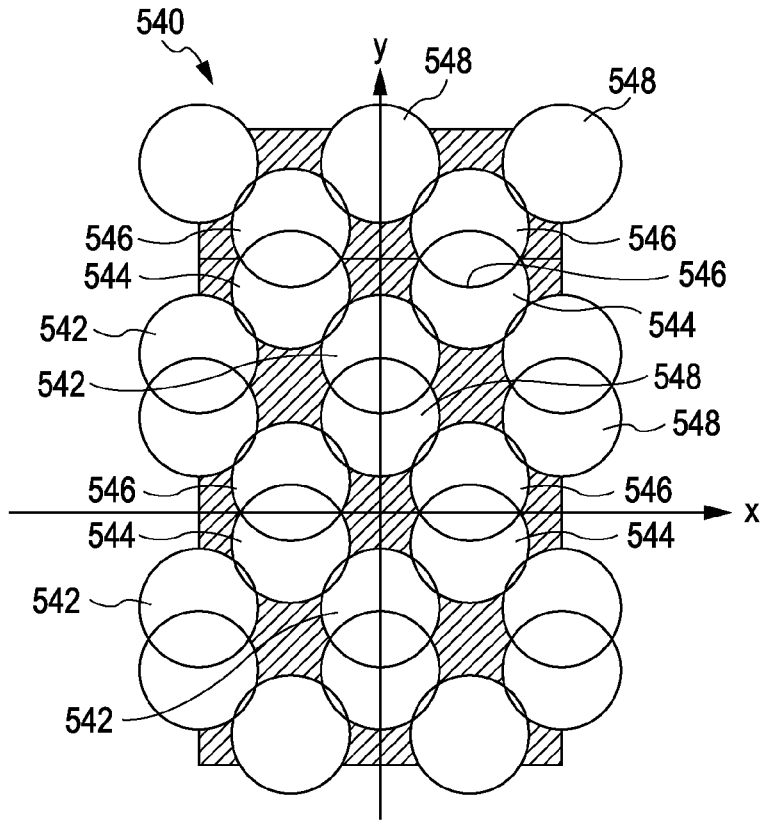

FIG. 4D is an x-y cross-sectional view of the fourth layer 540. The fourth layer 540 includes circular holes 542, 544, 546, and 548 that have the same shape and are disposed at the same transverse positions as the circular holes 522, 524, 526, and 528 formed in the second layer 520. The circular holes 542, 544, 546, and 548 are filled with the same medium as the circular holes 522, 524, 526, and 528.

Areas other than the circular holes 542, 544, 546, and 548 in the fourth layer 540 are filled with the third medium (having a high refractive index N3).

Columnar structures in the second layer 520 and the fourth layer 540 illustrated in FIGS. 4B and 4D are formed as described below in the second embodiment.

The second layer 520 includes the holes filled with the second medium at the lattice points of the rectangular lattices 521, 523, 525, and 527.

Columnar structures 122a are formed by filling area other than these holes with the third medium.

Columnar structures in the fourth layer 540 are the same as those in the second layer 520.

In the second embodiment, the following parameters are optimized to provide a complete photonic band gap in a desired frequency region (wavelength region): the refractive indices N1, N2, and N3 of the first medium, the second medium, and the third medium, the radius R1 of the circular holes in the first layer 510 and the third layer 530, the radius R2 of the circular holes in the second layer 520 and the fourth layer 540, the thicknesses of the layers 510 to 540, and the lattice periods A and B.

Figure 5:
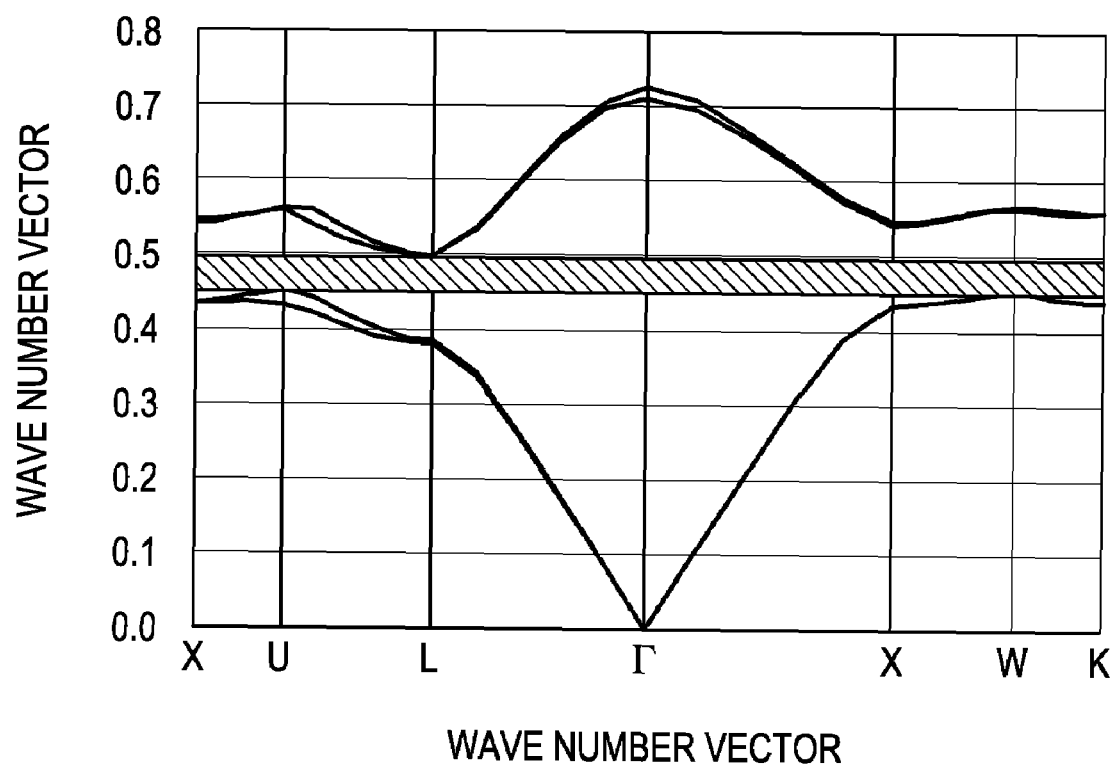
FIG. 5 is a schematic diagram of a photonic band structure of the three-dimensional photonic crystal according to the second embodiment of the present invention.

Table 2 illustrates an example of these parameters. FIG. 5 shows a photonic band structure of the three-dimensional photonic crystal shown in Table 2 calculated by the plane-wave expansion method.

In the hatched normalized frequency band shown in FIG. 5, a complete photonic band gap is formed. The complete photonic band gap ratio $\Delta\omega/\omega 0$ of this structure is 0.092.

This value is about 1.3 times the complete photonic bandgap ratio of the woodpile structure composed of media having the same refractive indices (the refractive index of the medium constituting the rectangular columns being 2.4 and the refractive index of the medium constituting areas other than the rectangular columns being 1.0).

Thus, the columnar structures formed by the holes in the second layer 520 and the fourth layer 540 have a higher degree of isotropy.

Whereas only four fundamental layers are periodically stacked to form a photonic crystal, a wider photonic band gap can be achieved.

Figure 6A:
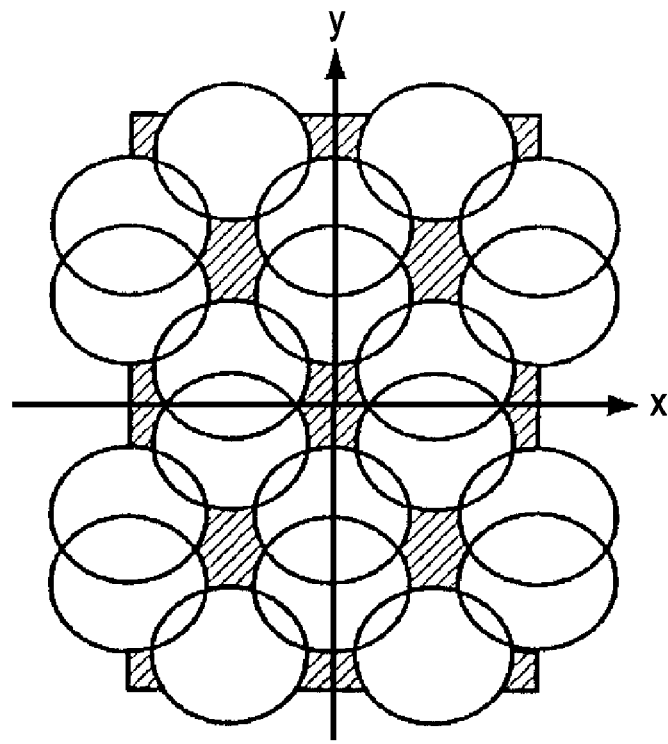
FIG. 6A is a schematic view of another second layer of the three-dimensional photonic crystal according to the second embodiment of the present invention.
Figure 6B:
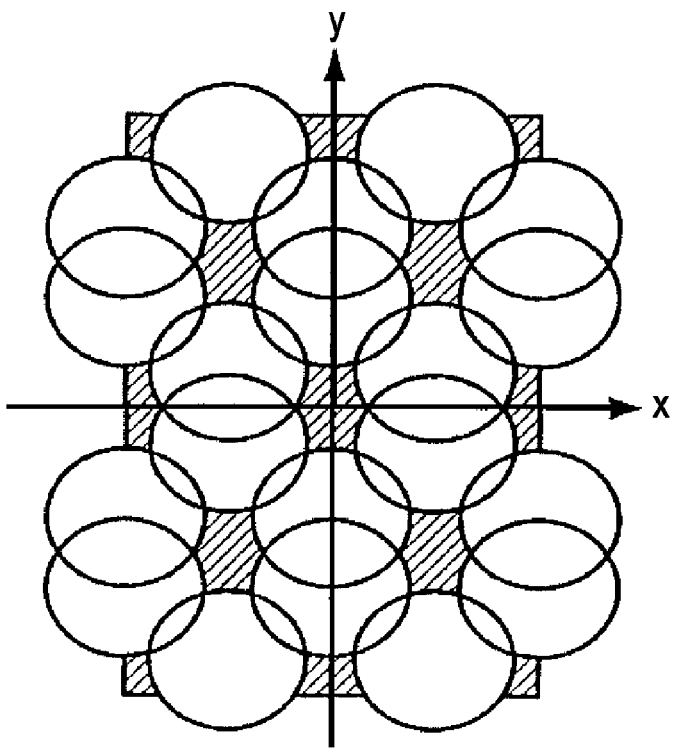
FIG. 6B is a schematic view of another second layer of the three-dimensional photonic crystal according to the second embodiment of the present invention.
Figure 7A:
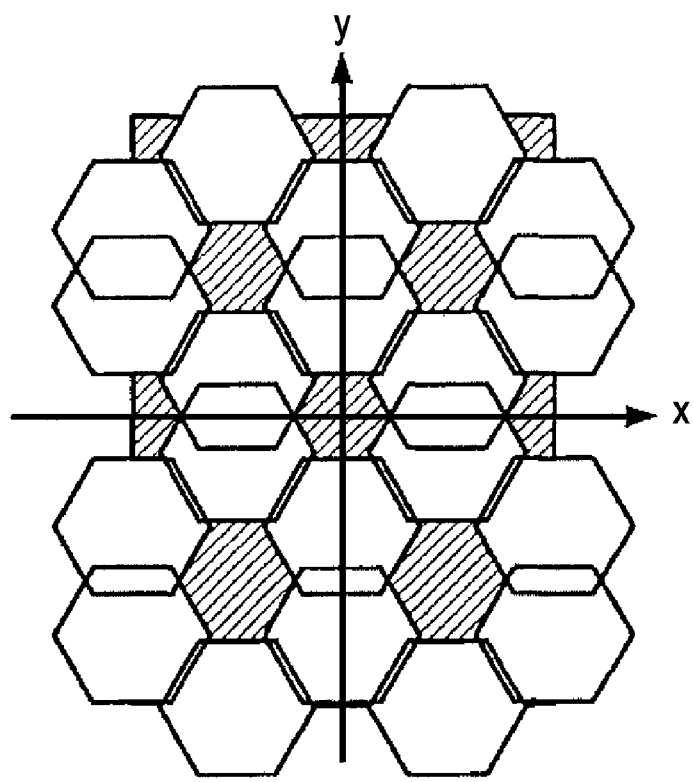
FIG. 7A is a schematic view of another second layer of the three-dimensional photonic crystal according to the second embodiment of the present invention.
Figure 7B:
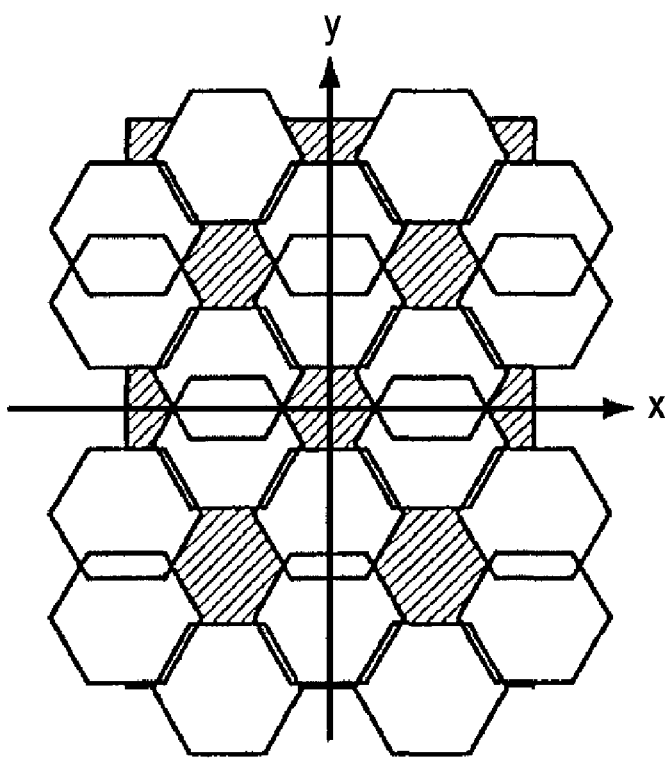
FIG. 7B is a schematic view of another second layer of the three-dimensional photonic crystal according to the second embodiment of the present invention.

In the second embodiment, the columnar structures are defined by forming the circular holes in the second layer 520 and the fourth layer 540. As illustrated in FIGS. 6A and 6B, elliptical holes may be used in place of the circular holes in the second layer 520 and the fourth layer 540 to achieve the same effects. Alternatively, as illustrated in FIGS. 7A and 7B, polygonal holes (for example, hexagonal holes or octagonal holes) may be used in place of the circular holes in the second layer 520 and the fourth layer 540 to achieve the same effects.

A photonic band structure of the three-dimensional photonic crystal shown in Table 3 is calculated by a plane-wave expansion method. The complete photonic band gap ratio $\Delta\omega/\omega 0$ of this structure is 0.230.

This value is about 1.3 times the complete photonic bandgap ratio of the woodpile structure composed of media having the same refractive indices (the refractive index of the medium constituting the rectangular columns being 3.3 and the refractive index of the medium constituting areas other than the rectangular columns being 1.0).

Thus, the effects of the present invention can be achieved even when the media forming the three-dimensional photonic crystal have different refractive indices.

Whereas only four fundamental layers are periodically stacked to form a photonic crystal, a wider photonic band gap can be achieved.

A photonic band structure of the three-dimensional photonic crystal shown in Table 4 is calculated by a plane-wave expansion method. The complete photonic band gap ratio $\Delta\omega/\omega 0$ of this structure is 0.119.

When the refractive index N3 of the third medium is larger than the refractive index N1 of the first medium, the contrast ratio of the refractive index increases. This increases a difference in energy between the standing wave concentrated in the high refractive index medium and the standing wave concentrated in the low refractive index medium. The increased energy difference can widen the frequency band at which a complete photonic band gap is achieved.

While the refractive index N1 of the first medium is smaller than the refractive index N3 of the third medium in Table 4, the refractive index N1 of the first medium may be larger than the refractive index N3 of the third medium to achieve the same effects.

TABLE 2

| | |
|---|---|
| Refractive index of first medium (N1) | 2.4 |
| Refractive index of second medium (N2) | 1.0 |
| Refractive index of third medium (N3) | 2.4 |
| Radius R1 | 0.435 × A |
| Radius R2 | 0.340 × A |
| Lattice period B | √2 × A |
| Thicknesses H1 of first layer 510 and third layer 530 | 0.280 × A |
| Thicknesses H2 of second layer 520 and fourth layer 540 | 0.220 × A |

TABLE 3

| | |
|---|---|
| Refractive index of first medium (N1) | 3.3 |
| Refractive index of second medium (N2) | 1.0 |
| Refractive index of third medium (N3) | 3.3 |
| Radius R1 | 0.470 × A |
| Radius R2 | 0.360 × A |
| Lattice period B | √2 × A |
| Thicknesses H1 of first layer 510 and third layer 530 | 0.250 × A |
| Thicknesses H2 of second layer 520 and fourth layer 540 | 0.250 × A |

TABLE 4

| | |
|---|---|
| Refractive index of first medium (N1) | 2.4 |
| Refractive index of second medium (N2) | 1.0 |
| Refractive index of third medium (N3) | 3.3 |
| Radius R1 | 0.440 × A |
| Radius R2 | 0.370 × A |
| Lattice period B | √2 × A |
| Thicknesses H1 of first layer | 0.340 × A |

TABLE 4-continued

| | |
|---|---|
| 510 and third layer 530 | |
| Thicknesses H2 of second layer 520 and fourth layer 540 | 0.160 × A |

Third Embodiment

FIGS. 8A to 8D are schematic views of each layer of a three-dimensional photonic crystal of the third embodiment of the present invention.

Figure 8A:
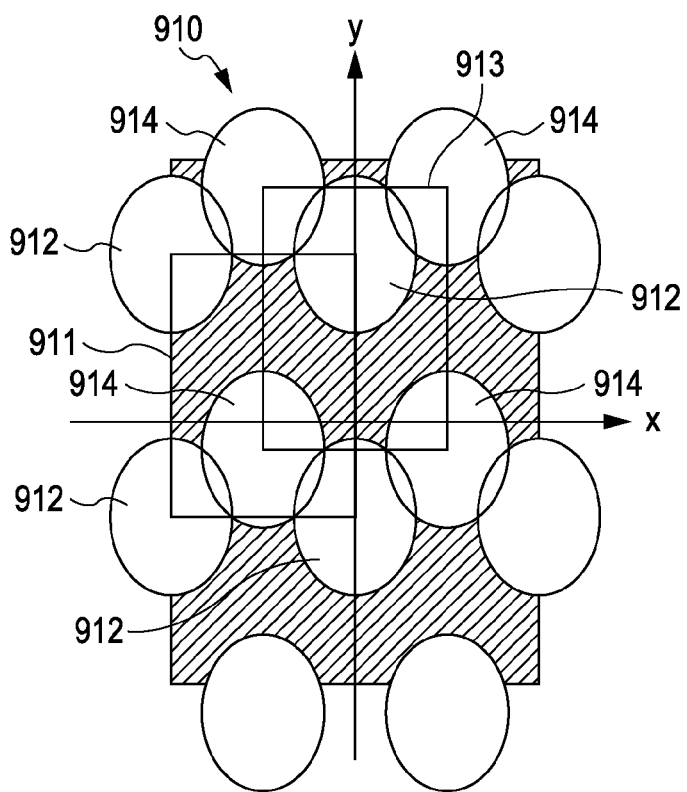
FIGS. 8A to 8D are schematic views of each layer of a three-dimensional photonic crystal according to a third embodiment of the present invention.

FIG. 8A is an x-y cross-sectional view of the first layer 910. In FIG. 8A, a rectangular lattice 911 has a period of A in the x-axis direction and a period of B in the y-axis direction. A rectangular lattice 913 has the same shape as that of the rectangular lattice 911 and is disposed at a position shifted by A/2 in the x-axis direction and by B/4 in the y-axis direction with respect to the position of the rectangular lattice 911. The first layer 910 has a periodic-refractive-index structure defined by the two rectangular lattices 911 and 913. More specifically, elliptical holes 912 having a long radius R1a and a short radius R1b and elliptical holes 914 having a long radius of R1a and a short radius R1b filled with a second medium (having a low refractive index N2) are disposed on each lattice point of the rectangular lattice 911 and the rectangular lattice 913. Areas other than the elliptical holes 912 and 914 are filled with a first medium (having a high refractive index N1).

Figure 8B:
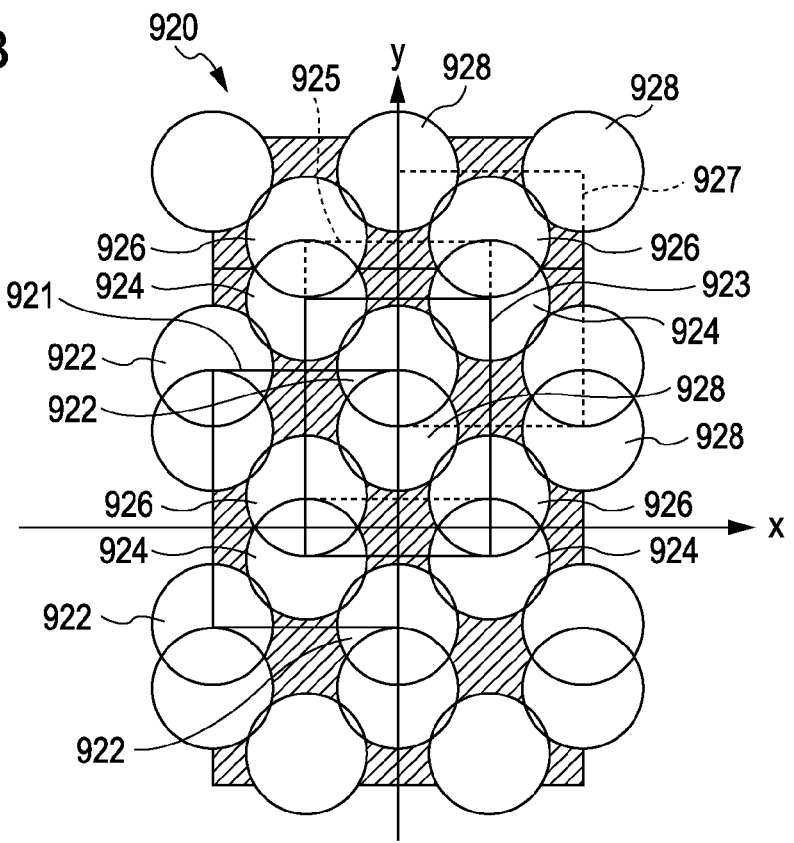
Figure 8C:
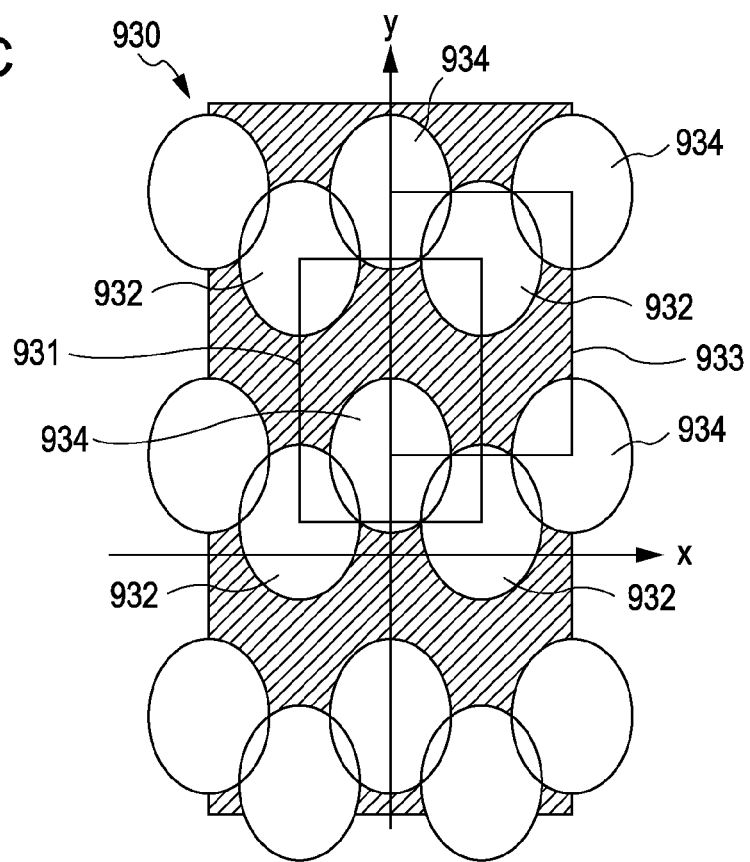

FIG. 8C is an x-y cross-sectional view of the third layer 930. In FIG. 8C, a rectangular lattice 931 and a rectangular lattice 933 are disposed at positions shifted by A/2 in the x-axis direction and by B/2 in the y-axis direction with respect to the positions of the rectangular lattice 911 and the rectangular lattice 913 in the first layer 910, respectively. Elliptical holes 932 and elliptical holes 934 having a long radius R1a and a short radius R1b are disposed at the lattice points of the rectangular lattice 931 and the rectangular lattice 933. The elliptical holes 932 and 934 are filled with the second medium.

Areas other than the elliptical holes 932 and 934 in the third layer 930 are filled with the first medium (having a high refractive index N1).

FIG. 8B is an x-y cross-sectional view of the second layer 920. Rectangular lattices 921 and 923 are disposed at the same transverse positions as the rectangular lattices 911 and 913 in the first layer 910. Circular holes 922 and 924 having a radius R2 are disposed at the lattice points of the rectangular lattices 921 and 923 and are filled with the second medium.

Rectangular lattices 925 and 927 in the second layer 920 are disposed at the same transverse positions as the rectangular lattices 931 and 933 in the third layer 930. Circular holes 926 and 928 having a radius R2 are disposed at the lattice points of the rectangular lattices 925 and 927 and are filled with the second medium. Areas other than the circular holes 922, 924, 926, and 928 in the second layer 920 are filled with a third medium (having a high refractive index N3).

Figure 8D:
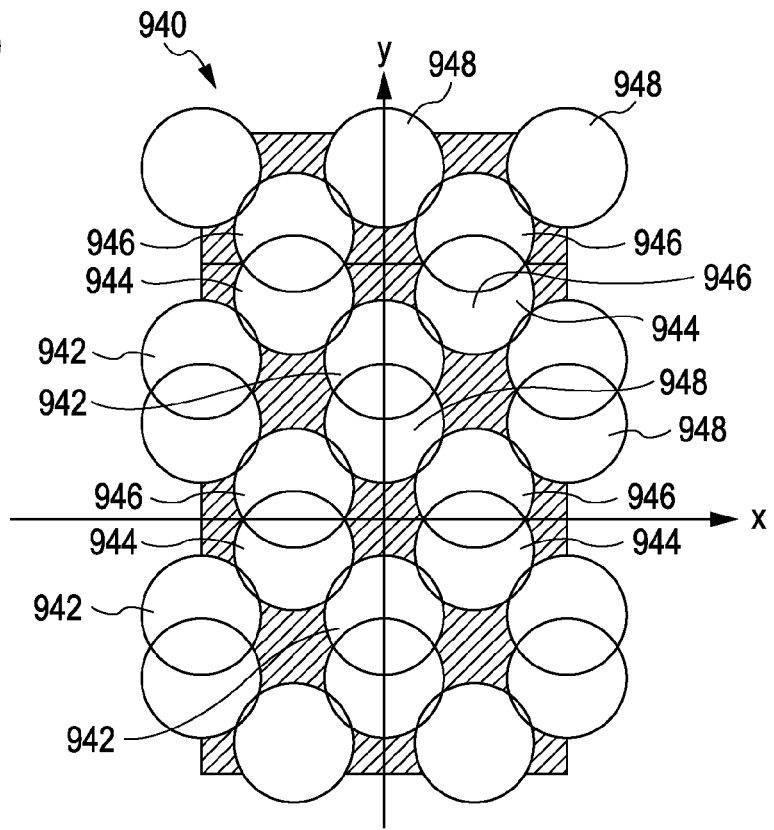

FIG. 8D is an x-y cross-sectional view of the fourth layer 940. The fourth layer 940 includes circular holes 942, 944, 946, and 948 that have the same shape and are disposed at the same transverse position as the circular holes 922, 924, 926, and 928 formed in the second layer 920. The circular holes 942, 944, 946, and 948 are filled with the same medium as the circular holes 922, 924, 926, and 928.

Areas other than the circular holes 942, 944, 946, and 948 in the fourth layer 940 are filled with the third medium (having a high refractive index N3).

In the third embodiment, the following parameters are optimized to provide a complete photonic band gap in a desired frequency (wavelength) region: the refractive indices N1, N2, and N3 of the first medium, the second medium, and the third medium, the long radius R1a and the short radius R1b of the elliptical holes formed in the first layer 910 and the third layer 930, the radius R2 of the circular holes formed in the second layer 920 and the fourth layer 940, the thicknesses of the layers 910 to 940, and the lattice periods A and B.

A photonic band structure of the three-dimensional photonic crystal shown in Table 5 is calculated by a plane-wave expansion method. The complete photonic band gap ratio $\Delta\omega/\omega 0$ of this structure is 0.092.

These results show that when the refractive index periodic structures in the first layer 910 and the third layer 930 are formed of the elliptical holes, the complete photonic band gap also exhibits smaller anisotropy. Whereas only four fundamental layers are periodically stacked to form a photonic crystal, a wider photonic band gap can be achieved.

To achieve the effects described above, while the elliptical hole are formed in the first layer 910 illustrated in FIG. 8A and the third layer 930 illustrated in FIG. 8C, the same effects can be achieved with polygonal holes.

TABLE 5

| | |
|---|---|
| Refractive index of first medium (N1) | 2.4 |
| Refractive index of second medium (N2) | 1.0 |
| Refractive index of third medium (N3) | 2.4 |
| Long radius R1a | 0.440 × A |
| Short radius R1b | 0.420 × A |
| Radius R2 | 0.340 |
| Lattice period B | $\sqrt{2} \times A$ |
| Thicknesses H1 of first layer 910 and third layer 930 | 0.280 × A |
| Thicknesses H2 of second layer 920 and fourth layer 940 | 0.220 × A |

A specific example of a method for manufacturing a three-dimensional photonic crystal will be described below.

Fourth Embodiment

FIGS. 9A to 9I illustrate a method for manufacturing a three-dimensional photonic crystal according to the fourth embodiment of the present invention.

Figure 9A:
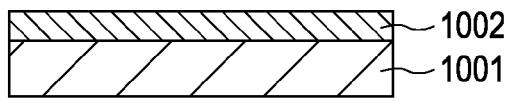
FIGS. 9A to 9I are cross-sectional views showing a method of producing a three-dimensional photonic crystal according to a fourth embodiment of the present invention.
Figure 9B:
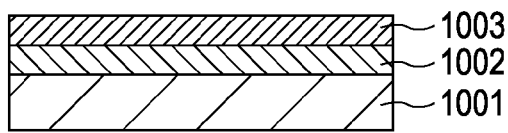
Figure 9C:
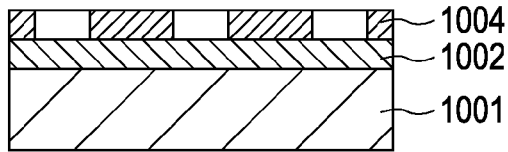

First, a first thin film 1002 composed of a medium 1 is formed on a first substrate 1001, for example, by crystal growth or vapor deposition (FIG. 9A). Then, a resist 1003 is applied to the first thin film 1002 (FIG. 9B). Then, a periodic resist pattern 1004 is formed, for example, by electron beam lithography (FIG. 9C). Holes are formed in the first thin film 1002 by etching using the periodic resist pattern 1004 as a mask.

Figure 9D:
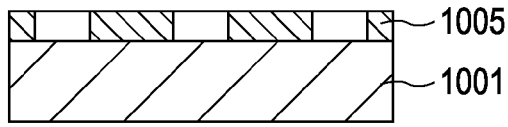

Then, a residual resist 1003 is removed to form a refractive index periodic structure 1005 having a periodic refractive index distribution in a first layer (FIG. 9D).

Figure 9E:
Figure 9F:
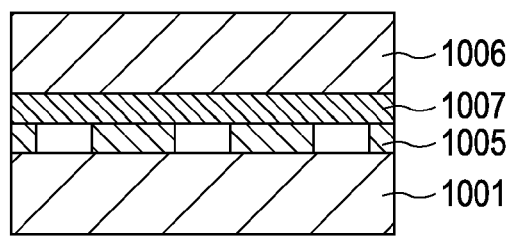

Then, a second thin film 1007 composed of a medium 3 is formed on a second substrate 1006, for example, by crystal growth or vapor deposition (FIG. 9E).

Figure 9G:
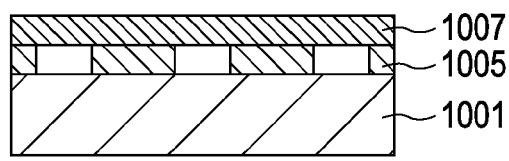

Then, the patterned surface of the refractive index periodic structure 1005 and the second thin film 1007 are fused to each other (FIG. 9F), and the second substrate 1006 is removed, for example, by lift-off or etching (FIG. 9G). By the steps described above, a second thin film 1007 is formed on the refractive index periodic structure 1005. As an alternative method for forming the second thin film on the refractive index periodic structure, voids in the refractive index periodic structure may be filled with a medium 2 or a medium that can be selectively etched in a downstream process, and then the second thin film may be formed on the refractive index periodic structure by crystal growth or vapor deposition.

Figure 9H:
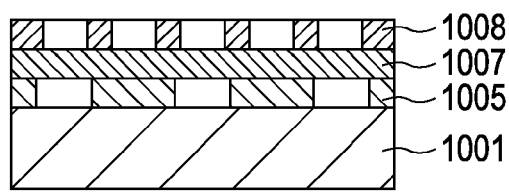

Then, a resist is applied to the second thin film 1007. A periodic resist pattern 1008 is formed, for example, by electron beam lithography (FIG. 9H).

Figure 9I:
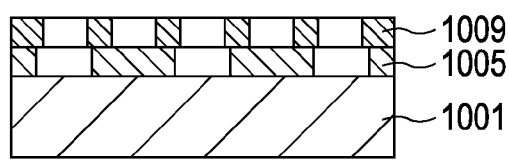

After etching of the second thin film 1007 using a periodic resist pattern 1008 as a mask, a residual resist is removed to form a refractive index periodic structure 1009 in a second layer on the first layer (FIG. 9I).

The steps described above are repeated to form a three-dimensional photonic crystal including a plurality of layers.

Figure 10:
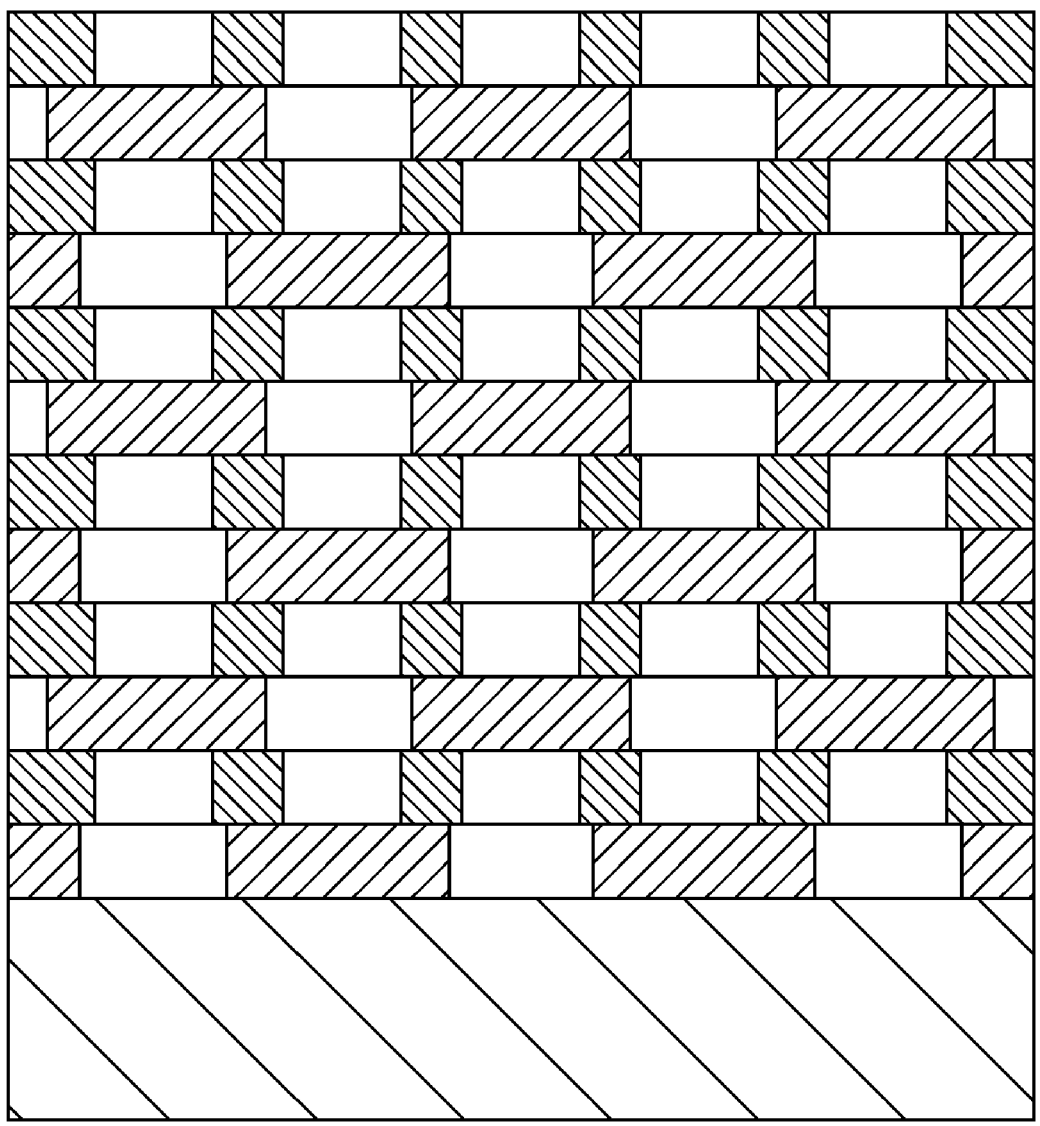
FIG. 10 is a cross-sectional view of a three-dimensional photonic crystal according to a fourth embodiment of the present invention.

FIG. 10 is a fragmentary sectional view of a three-dimensional photonic crystal according to the fourth embodiment of the present invention.

The refractive index periodic structures in the layers may be formed by an interference exposure method, a nanoimprint process, a method utilizing multiphoton absorption with an ultra-short light pulse, and a combination of lithography using X-ray exposure, UV exposure, or near-field exposure and etching.

The medium 1 and the medium 3 constituting a three-dimensional photonic crystal according to the present embodiment may be a compound semiconductor, such as GaAs, InP, GaN, or ZnO, a semiconductor, such as Si, a dielectric, such as $TiO_2$, or a metal.

The medium 1 and the medium 3 may be the same. When the medium 1 and the medium 3 are the same, wafer fusion or crystal growth can be performed easily on a refractive index periodic structure. Thus, a three-dimensional photonic crystal can be manufactured more easily.

The medium 2 (a region other than the medium 1 or the medium 3) may be air, a dielectric, such as $SiO_2$, or a polymeric organic material, such as PMMA.

In the fourth embodiment, after the second thin film 1007 is formed on the first layer 1005, the second layer 1009 is formed by a combination of electron beam lithography and etching.

Alternatively, a refractive index periodic structure can be formed in the second thin film 1007 on the second substrate 1006, and the first layer 1005 and the second thin film 1007 can then be fused to each other. The second substrate 1006 may subsequently be removed by lift-off or etching.

Fifth Embodiment

Another method for manufacturing a three-dimensional photonic crystal will be described below.

In this embodiment, holes are used to form columnar structures in a second layer and a fourth layer. Holes formed in four layers have the same in-plane cross-section. For example, in the xy cross-section of the three-dimensional photonic crystal illustrated in FIGS. 4A to 4D, the radius R1 of the circular holes in the first layer 510 and the third layer 530 is equal to the radius R2 of the circular holes in the second layer 520 and the fourth layer 540.

Figure 11A:
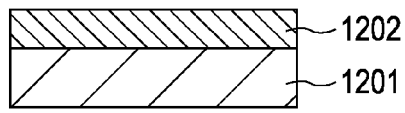
FIGS. 11A to 11K are cross-sectional views showing a method of producing a three-dimensional photonic crystal according to a fifth embodiment of the present invention.

As illustrated in FIG. 11A, a first thin film 1202 composed of a medium 1 is formed on a first substrate 1201 by crystal growth or vapor deposition.

Figure 11B:
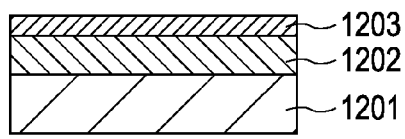

A resist 1203 is then applied to the first thin film 1202 (FIG. 11B).

Figure 11C:
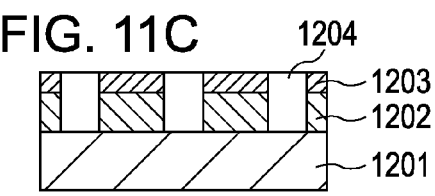
Figure 11D:
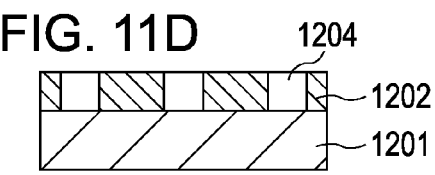

Then, a periodic pattern is formed in the resist by electron beam lithography. Subsequently, holes 1204 are formed in the first thin film 1202 by etching using the periodic resist pattern as a mask (FIG. 11C).

The residual resist 1203 is then removed to form a refractive index periodic structure in the first thin film 1202 on the first substrate 1201 (FIG. 1D).

Figure 11E:
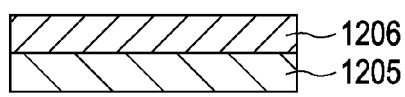
Figure 11F:
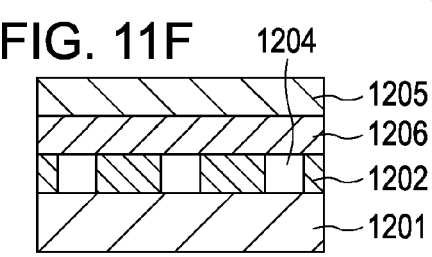
Figure 11G:
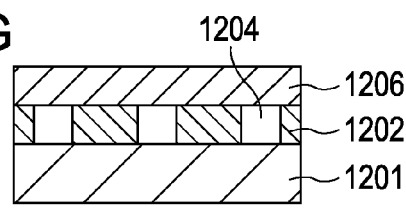

Then, as illustrated in FIG. 11E, a second thin film 1206 composed of the medium 1 is formed on a second substrate 1205. The second thin film 1206 and the patterned surface of the refractive index periodic structure (first refractive index periodic structure) in the first thin film 1202 are fused to each other (FIG. 11F). The second substrate 1205 is removed by lift-off or etching (FIG. 11G).

As an alternative method for forming the second thin film on the refractive index periodic structure, voids (holes 1204) in the refractive index periodic structure in the first thin film 1202 may be filled with a medium 2 or a medium that can be selectively etched in a downstream process, and then the second thin film 1206 may be formed on the refractive index periodic structure by crystal growth or vapor deposition.

Then, a resist 1207 is applied to the second thin film 1206. After a periodic resist pattern is formed by electron beam lithography, a refractive index periodic structure (second refractive index periodic structure) is formed in the second thin film 1206 by etching using the periodic resist pattern as a mask.

Figure 11H:
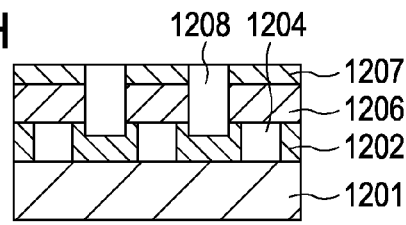
Figure 11I:
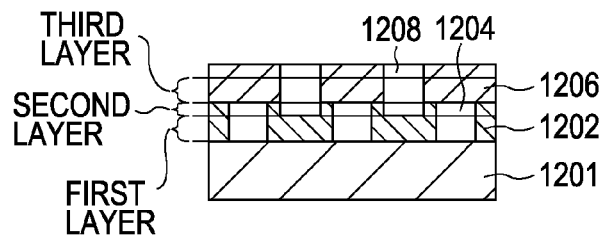

Holes 1208 are formed by etching (FIG. 11H). The holes have a depth larger than the thickness of the second thin film 1206. Subsequently, the residual resist 1207 is removed to form a second layer and a third layer at a time on the first layer of the three-dimensional photonic crystal (FIG. 11I).

Figure 11J:
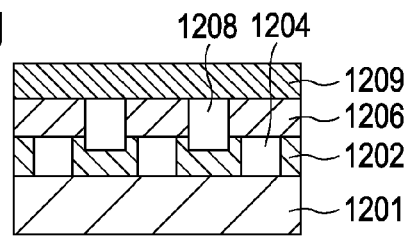

Then, using the same step as forming the second thin film 1206 on the first thin film 1202 illustrated in FIG. 11F, a third thin film 1209 composed of the medium 1 is formed on the second thin film 1206 having the refractive index periodic structure (FIG. 11J).

Then, using the same step as forming the refractive index periodic structure in the second thin film 1206 illustrated in FIG. 11H, holes 1210 are formed in the third thin film 1209.

Figure 11K:
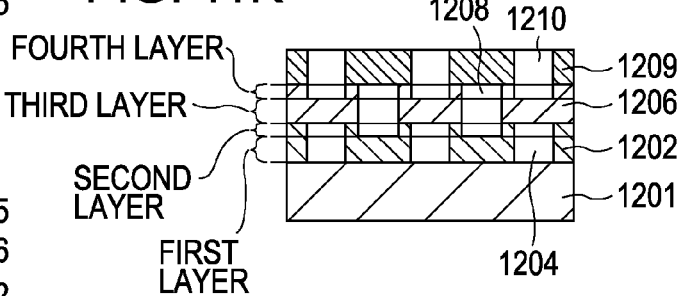

By the steps described above, the first layer, the second layer, the third layer, and the fourth layer of the three-dimensional photonic crystal are formed (FIG. 11K).

Figure 12:
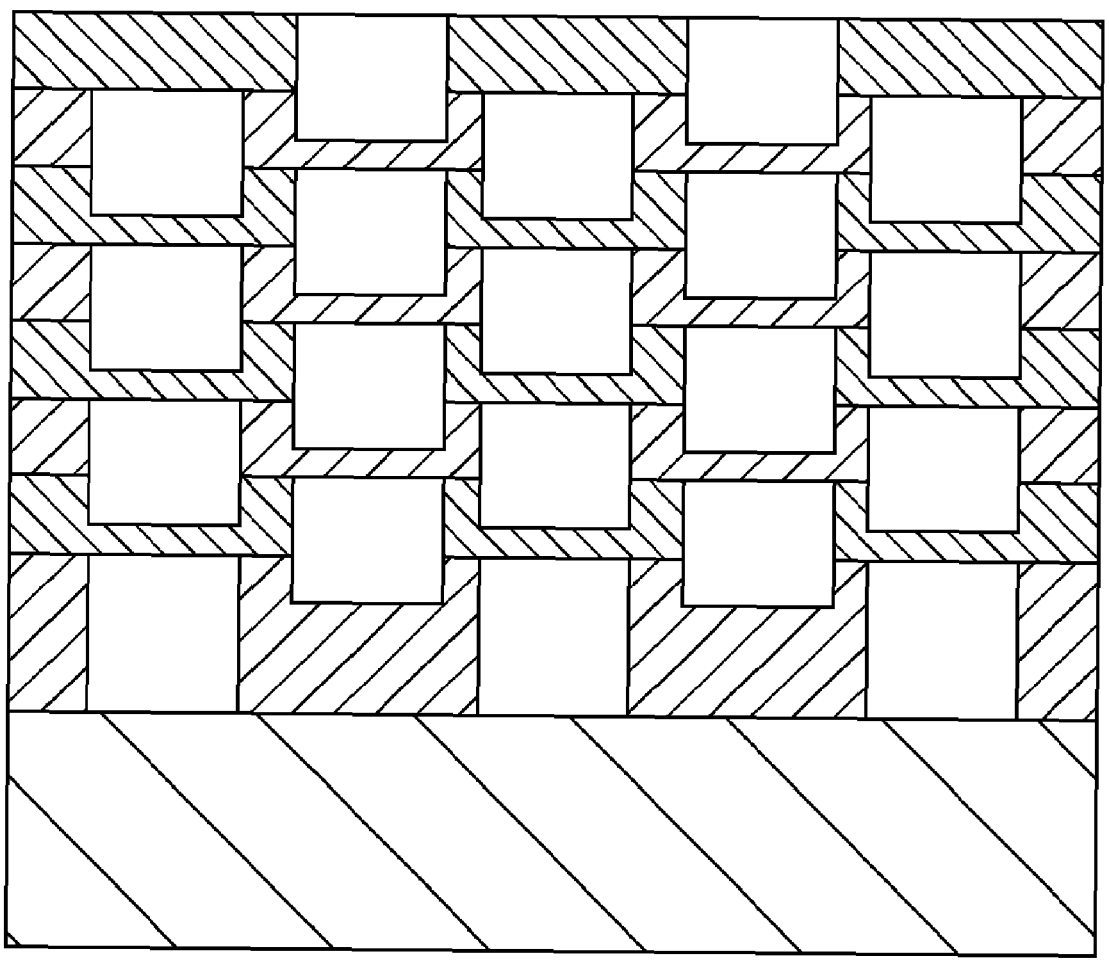
FIG. 12 is a cross-sectional view of a three-dimensional photonic crystal according to a fifth embodiment of the present invention.

FIG. 12 is a fragmentary sectional view of a three-dimensional photonic crystal including a plurality of layers manufactured by repeating the steps described above.

The refractive index periodic structures in the layers may be formed by an interference exposure method, a nanoimprint process, a method utilizing multiphoton absorption with an ultra-short light pulse, and a combination of lithography using X-ray exposure, UV exposure, or near-field exposure and etching.

The medium 1 forming a three-dimensional photonic crystal according to the present embodiment may be a compound semiconductor, such as GaAs, InP, GaN, or ZnO, a semiconductor, such as Si, a dielectric, such as $TiO_2$, or a metal. The medium 2 may be air, a dielectric, such as $SiO_2$, or a polymeric organic material, such as PMMA. According to the method described above, adjacent layers can be formed in the three-dimensional photonic crystal according to the present embodiment at the same time. Thus, a three-dimensional photonic crystal can be manufactured more easily and using a smaller number of steps.

Sixth Embodiment

Figure 13A:
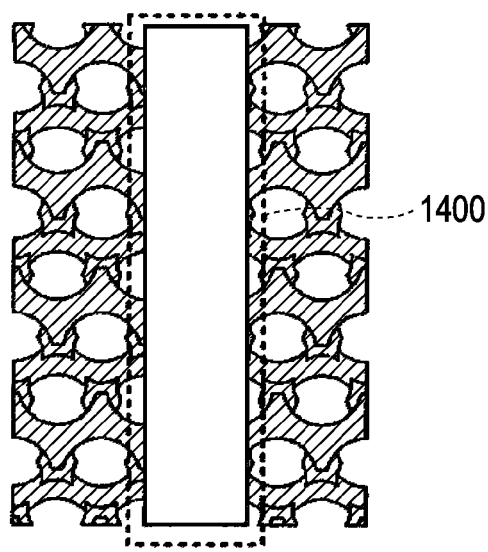
FIGS. 13A to 13C are cross-sectional views of functional devices including a three-dimensional photonic crystal according to a sixth embodiment of the present invention.
Figure 13B:
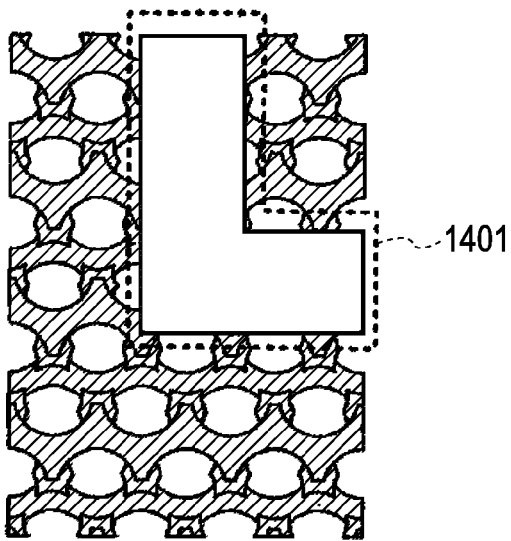

This embodiment describes a functional device including a three-dimensional photonic crystal according to the present invention. FIGS. 13A and 13B are cross-sectional views of functional devices including a three-dimensional photonic crystal according to the present invention. These three-dimensional photonic crystals include a waveguide 1400 or 1401, which is a linear defect that disorders the crystal structure.

An electromagnetic wave having a wavelength within the wavelength region of the complete photonic band gap of the three-dimensional photonic crystal can exist only in the defect 1400 or 1401.

Such a crystal structure can provide a sharply bent low-loss waveguide. FIG. 13A is a cross-sectional view of a functional device including a straight waveguide 1400, which is formed by providing a linear defect in a predetermined region in a three-dimensional photonic crystal according to the present invention. FIG. 13B is a cross-sectional view of a functional device including a bent waveguide 1401, which is formed by providing a linear defect in a predetermined region in a three-dimensional photonic crystal according to the present invention. The linear defect may be formed by removing part of the crystal structure, changing the position or the shape of part of the crystal structure, or replacing part of the crystal structure with a medium having a refractive index different from the media that form the crystal structure so that the waveguide can have a desired performance, such as a desired wavelength region.

Figure 13C:
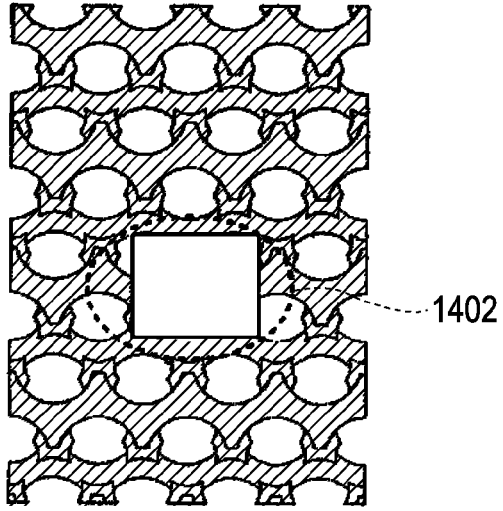
Figure 14A:
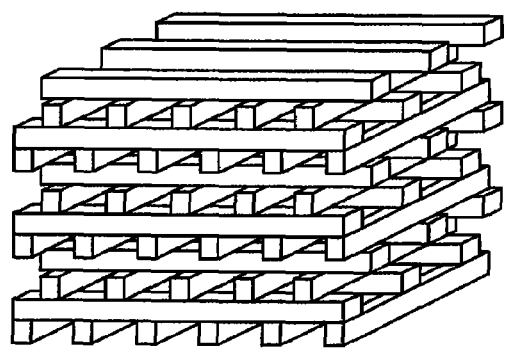
FIGS. 14A to 14C are views illustrating known three-dimensional photonic crystals.
Figure 14B:
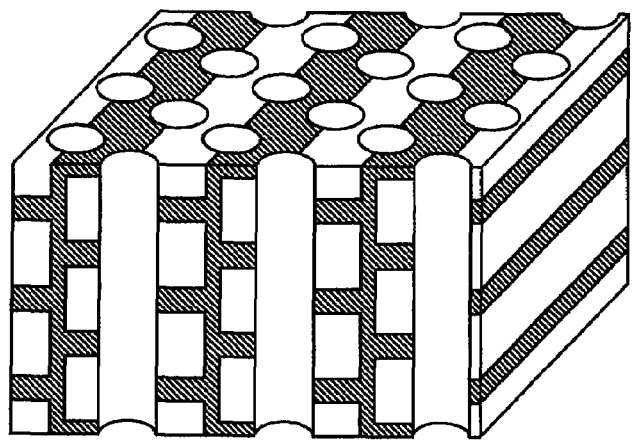
Figure 14C:
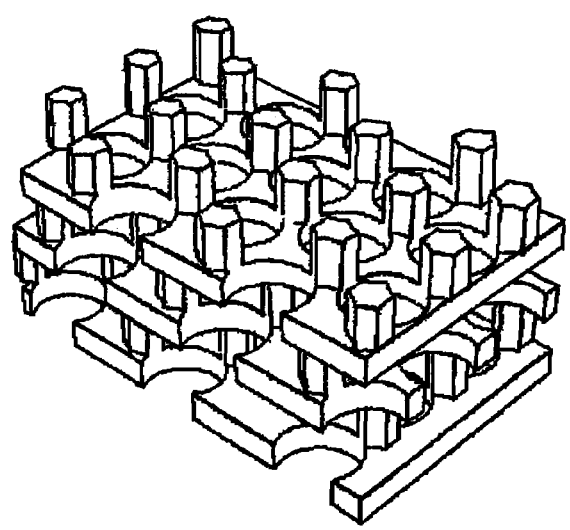

FIG. 13C is a cross-sectional view of a resonator including a point defect 1402, which disorders the crystal structure, in a three-dimensional photonic crystal according to the present invention. An electromagnetic wave having a wavelength within the wavelength region of the complete photonic band gap of the three-dimensional photonic crystal can exist only in the point defect 1402.

The resonator can effectively trap an electromagnetic wave in this very small area. This resonator can be used to provide a wavelength selection filter, which extracts an electromagnetic wave in a very narrow wavelength region corresponding to the resonant wavelength of the resonator from an incident wave.

The point defect may be formed by removing part of the crystal structure or changing the position or the shape of part of the crystal structure so that the resonator can have a desired performance, such as selection of a desired wavelength. Using a three-dimensional photonic crystal manufactured by a method according to the present invention, a resonator that operates at a desired wavelength region can be manufactured more easily.

When the resonator illustrated in FIG. 13C is filled with an active medium, such as for example a luminous active medium, and is supplied with an energy using an electromagnetic wave or an electric current from the outside of the resonator, a highly efficient light-emitting device, such as a laser or an LED, can be provided.

For example, when the resonant wavelength of the resonator corresponds to the infrared communication band (800 nm to 1800 nm), the resonator can be used in a light source for optical communication. When the resonant wavelength of the resonator corresponds to the three primary colors of light, that is, red (R), green (G), and blue (B), the resonator can be used in a light source for a visual display unit.

Furthermore, the resonator can be used in a light source for optical pickup in an optical device, such as a CD or DVD player.

Furthermore, various functional devices, such as the waveguides illustrated in FIGS. 13A and 13B, the resonator illustrated in FIG. 13C, a light-emitting device, and a polarizer utilizing abnormal dispersion in the photonic band may be combined to provide a high-performance integrated microcircuit.

As described above, because a three-dimensional photonic crystal according to the present embodiments includes only four layers, it is manufactured easily. In addition, since the refractive index periodic structure has smaller direction dependency, the three-dimensional photonic crystal has a wider complete photonic band gap than known three-dimensional photonic crystals.

Functional devices including three-dimensional photonic crystals according to the present embodiments can easily be manufactured, and be operated at wider wavelength bands.

Thus, according to the present embodiments, a three-dimensional photonic crystal can be composed of cycles each consisting of a reduced number of layers and therefore can easily be manufactured. Furthermore, the three-dimensional photonic crystal has a complete photonic band gap at a wider wavelength region. A functional device including the three-dimensional photonic crystal can also be manufactured.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-311259 filed Oct. 26, 2005, and Japanese Application No. 2006-254437 filed 20 Sep. 2006, both of which are hereby incorporated by reference herein in their entirety.

What is claimed is:

1. A three-dimensional photonic crystal in which a plurality of layers including a periodic-refractive-index structure are periodically stacked, comprising:
  a first layer having a periodic structure in which holes filled with a second medium are provided at lattice points of a first rectangular lattice having a period of A along a first axis in the in-plane direction of the layers and a period of B along a second axis orthogonal to the first axis in the in-plane direction of the layers and at lattice points of a second rectangular lattice disposed at a position shifted by A/2 along the first axis and by B/4 along the second axis with respect to the position of the first rectangular lattice, and areas other than the holes are filled with a first medium;
  a second layer having a periodic structure in which columnar structures that are composed of a third medium and that have a longitudinal axis in the stacking direction are provided at lattice points of a face-centered rectangular lattice that is disposed at a position shifted by +3B/8 along the second axis with respect to the position of the first rectangular lattice and that has a period of A along the first axis and a period of B along the second axis, and the area other than the columnar structures is filled with the second medium;
  a third layer having a periodic structure the same as the periodic structure included in the first layer and disposed at a position shifted in the in-plane directions of the layer by A/2 along the first axis and by B/2 along the second axis with respect to the position of the periodic structure included in the first layer; and a fourth layer having a periodic structure the same as the periodic structure included in the second layer and disposed at the same position as the periodic structure included in the second layer in the in-plane direction of the layer, wherein the first layer, the second layer, the third layer, and the fourth layer are periodically stacked in this order.

2. The three-dimensional photonic crystal according to claim 1, wherein the holes formed in the first layer and the third layer have a circular or elliptical in-plane cross-section.

3. The three-dimensional photonic crystal according to claim 1, wherein, in the second layer and the fourth layer, the columnar structures composed of the third medium are formed by a plurality of holes that are disposed at the same positions as the holes in the first layer and the holes in the third layer in the in-plane direction of the layers and that are filled with the second medium, and areas other than the plurality of holes.

4. The three-dimensional photonic crystal according to claim 3, wherein the holes formed in the second layer and the fourth layer have a circular or elliptical in-plane cross-section.

5. The three-dimensional photonic crystal according to claim 4, wherein the holes formed in the first layer and the third layer have a circular or elliptical in-plane cross-section.

6. The three-dimensional photonic crystal according to claim 5, wherein the holes formed in the second layer and the fourth layer have the same in-plane cross-section as the holes formed in the first layer and the third layer.

7. The three-dimensional photonic crystal according to claim 3, wherein the holes formed in the second layer and the fourth layer have the same in-plane cross-section as the holes formed in the first layer and the third layer.

8. The three-dimensional photonic crystal according to claim 1, wherein the columnar structures have a polygonal in-plane cross-section.

9. The three-dimensional photonic crystal according to claim 1, wherein the first medium and the third medium are different.

10. The three-dimensional photonic crystal according to claim 1, wherein the first medium and the third medium are the same.

11. A functional device comprising a three-dimensional photonic crystal according to claim 1 and a defect within the three-dimensional photonic crystal.

12. The functional device according to claim 11, wherein the defect is a linear defect that constitutes a waveguide.

13. The functional device according to claim 11, wherein the defect is a point defect that constitutes a resonator.

14. The functional device according to claim 13, wherein the resonator comprises a luminous active medium.

15. A method of producing a three-dimensional photonic crystal comprising the steps of:

forming a layer having a first periodic-refractive-index structure on a substrate;

forming a thin film on the layer having the first periodic-refractive-index structure; and forming a second periodic-refractive-index structure in the thin film by etching the thin film so that the depth of holes formed by the etching is larger than the thickness of the thin film to produce the three-dimensional photonic crystal according to claim 1.

* * * * *